United States Patent
Seo et al.

(10) Patent No.: US 10,080,206 B2
(45) Date of Patent: Sep. 18, 2018

(54) METHOD OF SELECTING SYNCHRONIZATION SOURCE IN WIRELESS COMMUNICATION SYSTEM AND APPARATUS THEREFOR

(71) Applicant: LG ELECTRONICS INC., Seoul (KR)

(72) Inventors: Inkwon Seo, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 14/964,158

(22) Filed: Dec. 9, 2015

(65) Prior Publication Data

US 2016/0174179 A1    Jun. 16, 2016

Related U.S. Application Data

(60) Provisional application No. 62/090,353, filed on Dec. 10, 2014, provisional application No. 62/145,498, filed on Apr. 9, 2015.

(51) Int. Cl.
| | | |
|---|---|---|
| *H04W 56/00* | (2009.01) | |
| *H04W 76/02* | (2009.01) | |
| *H04W 76/23* | (2018.01) | |
| *H04W 76/14* | (2018.01) | |

(52) U.S. Cl.
CPC ....... *H04W 56/0015* (2013.01); *H04W 76/14* (2018.02); *H04W 76/23* (2018.02)

(58) Field of Classification Search
CPC ......... H04W 56/0015; H04W 56/0025; H04W 76/023; H04W 76/23
See application file for complete search history.

(56) References Cited

U.S. PATENT DOCUMENTS

| | | | |
|---|---|---|---|
| 2014/0280937 A1* | 9/2014 | Miller | H04W 4/22 709/225 |
| 2016/0295623 A1* | 10/2016 | Kazmi | H04W 76/023 |
| 2017/0006563 A1* | 1/2017 | Lindoff | H04W 56/001 |
| 2017/0041773 A1* | 2/2017 | Fujishiro | H04W 8/005 |
| 2017/0079035 A1* | 3/2017 | Seo | H04W 72/1242 |

* cited by examiner

*Primary Examiner* — Hoon J Chung
(74) *Attorney, Agent, or Firm* — Birch, Stewart, Kolasch & Birch, LLP

(57) ABSTRACT

According to one embodiment of the present invention, a method of selecting a synchronization source, which is selected by a D2D (device-to-device) UE in a wireless communication system includes the steps of receiving a plurality of synchronization signals, selecting a plurality of candidate synchronization signals from a plurality of the synchronization signals and determining a synchronization signal in a manner of applying a priority to a plurality of the candidate synchronization signals and selecting a UE, which has transmitted the determined synchronization signal, as a synchronization source. In this case, the application of the priority can be performed in a manner of sequentially applying a plurality of priorities related to a D2D signal according to a priority for the application of the priority.

12 Claims, 9 Drawing Sheets

(a)

(b)

(a)

D2D signal
transmission from a UE
allocated with unit # 0

(b)

METHOD OF SELECTING SYNCHRONIZATION SOURCE IN WIRELESS COMMUNICATION SYSTEM AND APPARATUS THEREFOR

This application claims the benefit of the U.S. Provisional Application No. 62/090,353, filed on Dec. 10, 2014 and No. 62/145,498, filed on Apr. 9, 2015, which are hereby incorporated by reference as if fully set forth herein.

BACKGROUND OF THE INVENTION

Field of the Invention

The present invention relates to a wireless communication system, and more particularly, to a method of receiving a plurality of synchronization signals and selecting an appropriate synchronization source and an apparatus therefor.

Discussion of the Related Art

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

SUMMARY OF THE INVENTION

Accordingly, the present invention is directed to an apparatus and method thereof that substantially obviate one or more problems due to limitations and disadvantages of the related art.

A technical task of the present invention is to provide a method of selecting a synchronization source transmitting a synchronization signal.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment of the present invention, a method of selecting a synchronization source, which is selected by a D2D (device-to-device) UE in a wireless communication system, can include the steps of receiving a plurality of synchronization signals, selecting a plurality of candidate synchronization signals from a plurality of the synchronization signals and determining a synchronization signal in a manner of applying a priority to a plurality of the candidate synchronization signals and selecting a UE, which has transmitted the determined synchronization signal, as a synchronization source. In this case, the application of the priority can be performed in a manner of sequentially applying a plurality of priorities related to a D2D signal according to a priority for the application of the priority.

To further achieve these objects and other advantages and in accordance with the purpose of the invention, as embodied and broadly described herein, according to a different embodiment of the present invention, a D2D (device-to-device) UE selecting a synchronization signal in a wireless communication system can include a transmitter and a processor, the processor configured to receive a plurality of synchronization signals, the processor configured to select a plurality of candidate synchronization signals from a plurality of the synchronization signals, the processor configured to determine a synchronization signal in a manner of applying a priority to a plurality of the candidate synchronization signals and select a UE, which has transmitted the determined synchronization signal, as a synchronization source. In this case, the application of the priority can be performed in a manner of sequentially applying a plurality of priorities related to a D2D signal according to a priority for the application of the priority.

A plurality of the priorities related to the D2D signal can include at least two selected from the group consisting of a priority according to a purpose of data, a priority according to a type of a signal to be transmitted after a synchronization signal, a priority according to a target of a D2D signal to be transmitted after a synchronization signal, a priority according to a position of a synchronization source and a priority according to a type of a synchronization source.

An importance between elements in each of a plurality of the priorities can be indicated to the UE via high layer signaling.

The priority for the application of the priority can be indicated to the UE via high layer signaling.

The priority according to the purpose of data can be defined as important in an order of a public safety message, a UE-specific message and a commercial message.

The priority according to the type of the signal to be transmitted after the synchronization signal can be defined as important in an order of a discovery signal and a communication signal.

The priority according to the target of the D2D signal to be transmitted after the synchronization signal can be defined as important in an order of a discovery signal and a communication signal.

The priority according to the position of the synchronization source can be defined as important in an order of in-coverage and out-coverage.

The priority according to the type of the synchronization source can be defined as important in an order of a relay UE and a UE not the relay UE.

The priority can be identified by one selected from the group consisting of a root index used for generating a synchronization signal, a PD2DSCH (physical D2D synchronization channel), a plurality of SAs (scheduling assignments) and a resource pool from which each of a plurality of the SAs is detected.

A plurality of the SAs can be received based on each of a plurality of the selected candidate synchronization signals.

The plurality of candidate synchronization signal can be selected in order of reception signal strength is big.

The plurality of candidate synchronization signal can be selected in order of a correlation result.

According to the present invention, a user equipment can select a most suitable synchronization signal in a situation that a plurality of synchronization signals are scattered.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Figure 1:
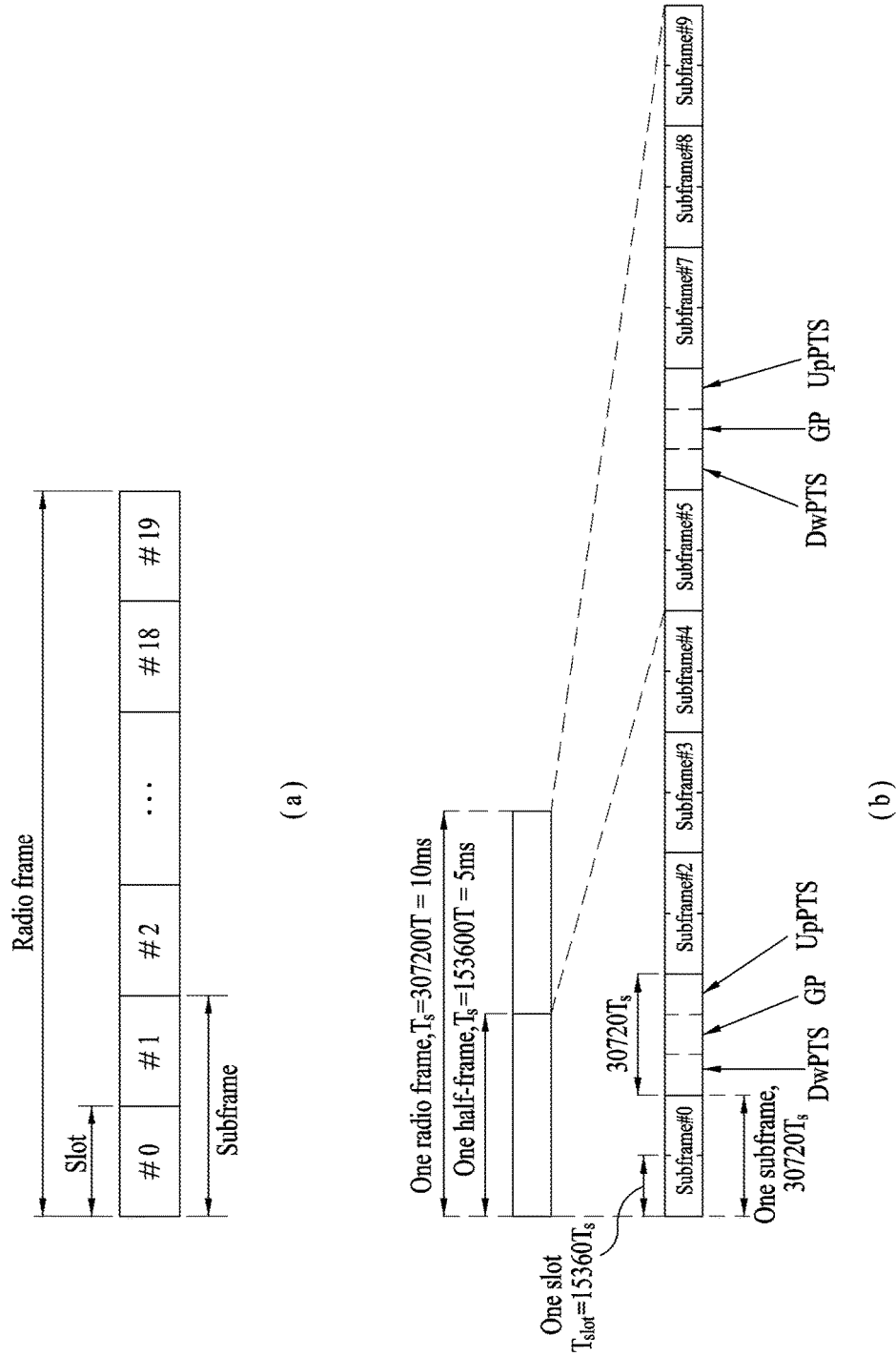
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink.

LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
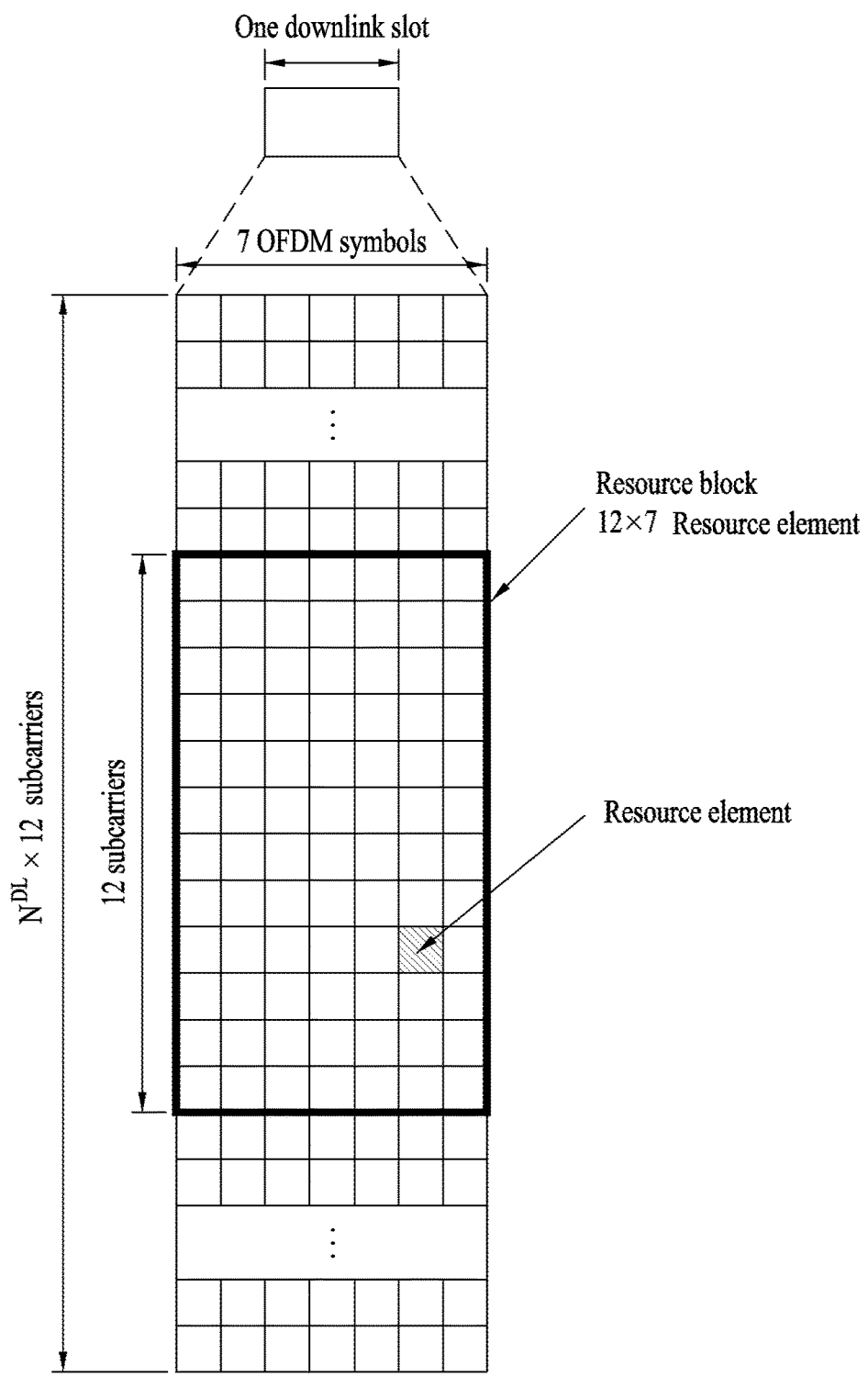
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
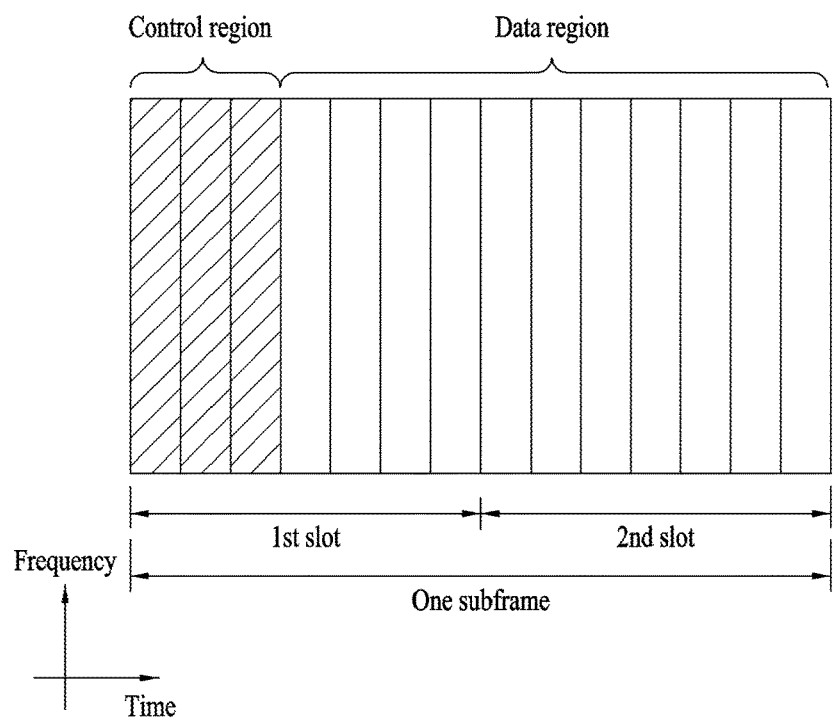
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
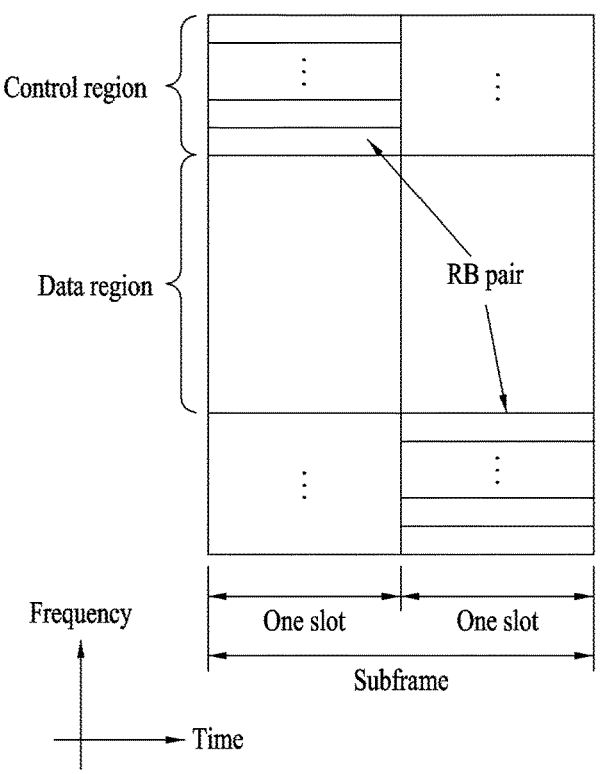
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

MIMO System Modeling

Figure 5:
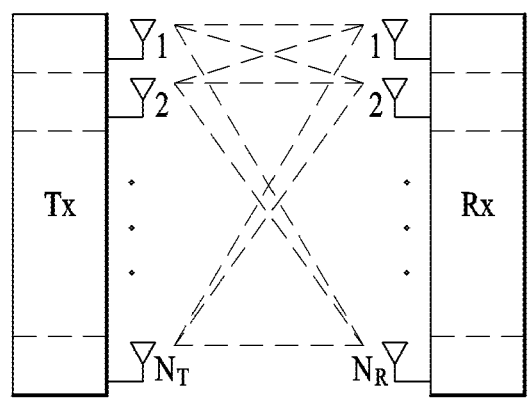
FIG. 5 is a configuration diagram for a wireless communication system equipped with multiple antennas.
Figure 5:
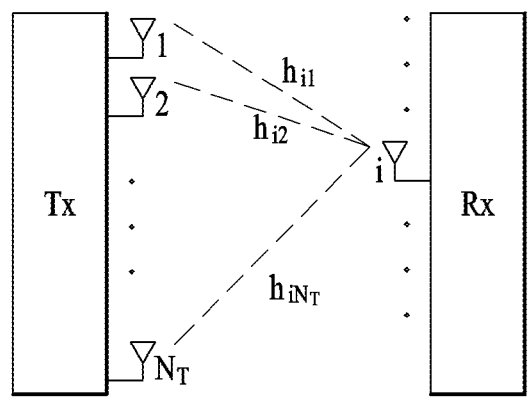

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vectors ŝ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_n}$ may be represented as the following vector.

$$y = [y_1, y_2, \ldots, y_{N_n}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_RN_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} +$$ [Equation 10]

$$\begin{bmatrix} n_1 \\ n_2 \\ \vdots \\ n_i \\ \vdots \\ n_{N_R} \end{bmatrix} = Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_A) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Synchronization Acquisition of D2D UE

In the following, synchronization acquisition between UEs in D2D communication is explained based on the aforementioned discussion and a legacy LTE/LTE-A system. If time/frequency synchronization is not matched with each other in OFDM system, it may be difficult to perform multiplexing between UEs different from each other in an OFDM signal due to inter-cell interference. If each of D2D UEs individually matches synchronization in a manner of directly transceiving a synchronization signal between D2D UEs, it is inefficient. Hence, in a distributed node system such as D2D, a specific node transmits a representative synchronization signal and the rest of UEs can match synchronization in accordance with the representative synchronization signal. In other word, in order to transmit and receive a D2D signal, it may use a scheme of transmitting and receiving a signal in a manner that a part of nodes (in this case, a node may correspond to an eNB, a UE, or an SRN (synchronization reference node or a synchronization source)) transmits a D2D synchronization signal (D2DSS) and the rest of UEs match synchronization with the D2DSS.

A D2D synchronization signal includes a primary synchronization signal (PD2DSS (Primary D2DSS)) or PSSS (Primary Sidelink synchronization signal)) and a secondary synchronization signal (SD2DSS (Secondary D2DSS) or SSSS (secondary Sidelink synchronization signal)). The PD2DSS may correspond to a Zadoff-chu sequence of a prescribed length or a structure similar/transformed/repeated to/from a PSS. The SD2DSS may correspond to an M-sequence or a structure similar/transformed/repeated to/from an SSS. If UEs match synchronization from an eNB, an SRN becomes the eNB and a D2DSS becomes a PSS/SSS. A PD2DSCH (Physical D2D synchronization channel) may correspond to a (broadcast) channel on which basic (system) information (e.g., information on a D2DSS, DM (duplex mode), TDD UL/DL configuration, information on a resource pool, a type of application related to a D2DSS, etc.), which should be known to a UE before a D2D signal is transceived, is transmitted. The PD2DSCH can be transmitted in a subframe in which a D2DSS is transmitted or a following subframe of the subframe in which the D2DSS is transmitted.

The SRN may correspond to a node transmitting a D2DSS and a PD2DSCH (Physical D2D synchronization channel). The D2DSS may have a form of a specific sequence and the PD2DSCH may correspond to a sequence indicating specific information or may have a form of a codeword of which a predetermined channel coding is underwent. In this case, the SRN may become an eNB or a specific D2D UE. In case of partial network coverage or out of network coverage, a UE may become the SRN.

Figure 6:
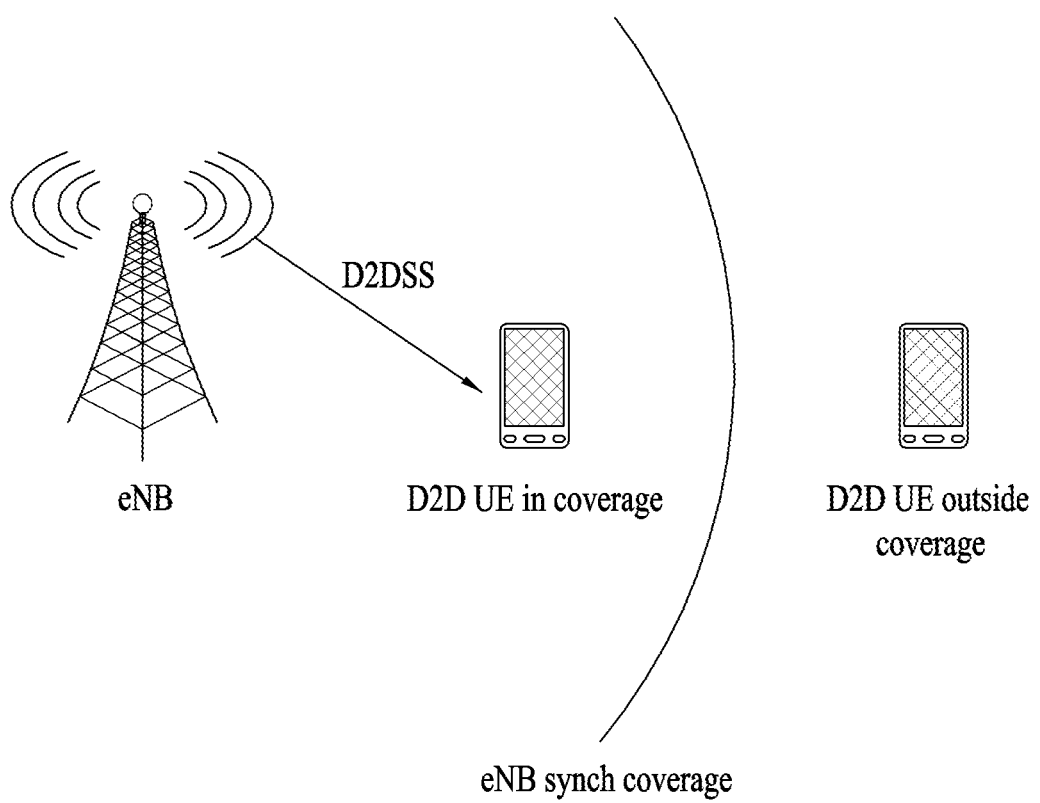
FIG. 6 is a diagram for explaining relay of a D2D signal.

In a situation such as FIG. 6, a D2DSS can be relayed to perform D2D communication with an out of coverage UE. And, the D2DSS can be relayed via multi-hop. In the following description, relaying a synchronization signal corresponds to a concept indicating not only directly AF relaying a synchronization signal of an eNB but also transmitting a D2D synchronization signal of a separate format in accordance with timing of receiving a synchronization signal. As mentioned above, if a D2D synchronization signal is relayed, direct communication can be performed between in coverage UE and out of coverage UE.

D2D Resource Pool

Figure 7:
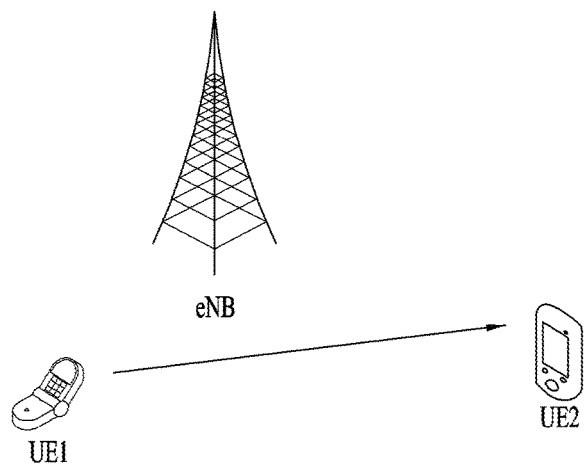
FIG. 7 is a diagram for an example of a D2D resource pool for D2D communication.
Figure 7:
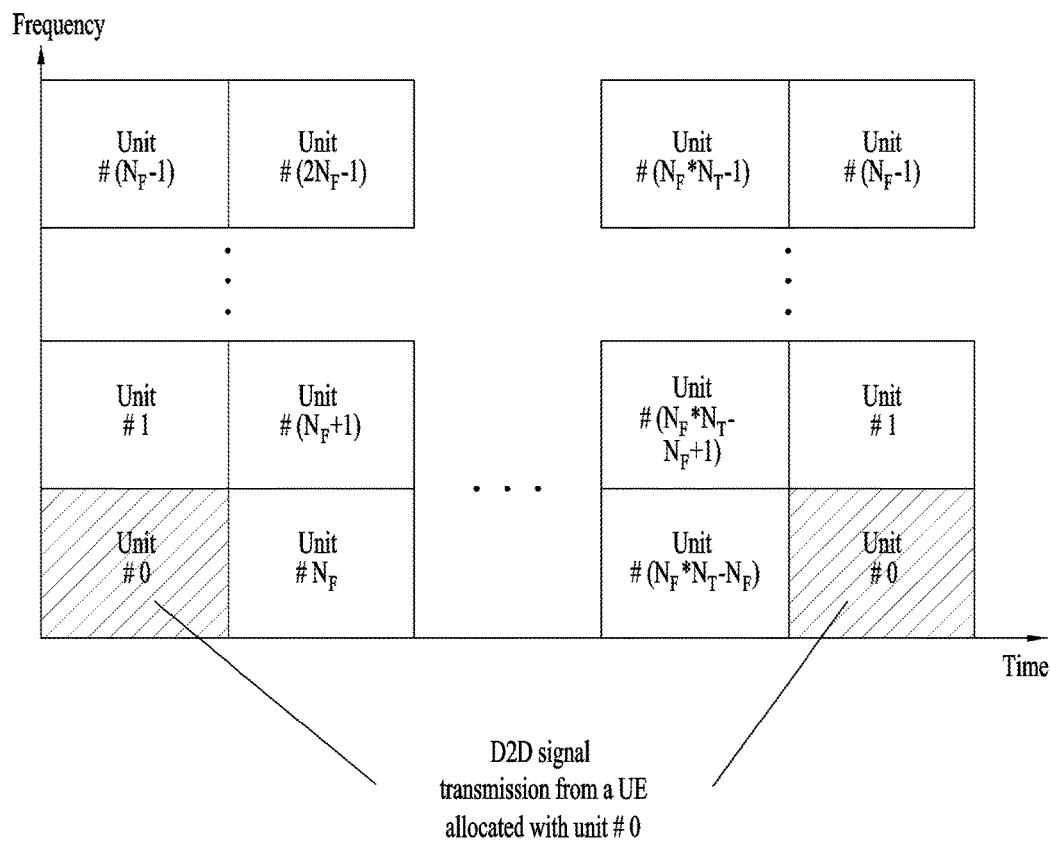

FIG. 7 shows a UE1 and a UE2 performing D2D communication and an example of a D2D resource pool used by the UE1 and the UE2. In FIG. 7 (*a*), a UE indicates such a network device as a UE, an eNB transmitting and receiving a signal according to a D2D communication scheme and the like. A UE selects a resource unit corresponding to a specific resource from a resource pool corresponding to a series of resources and may be then able to transmit and receive a D2D signal using the selected resource unit. A resource pool usable for a UE1 to transmit a signal is configured to a receiving UE (UE2) and the receiving UE can detect a signal of the UE1 in the resource pool. If the UE1 is located at the inside of a connection range of an eNB, the eNB can inform the UE1 of the resource pool. If the UE1 is located at the outside of the connection range of the eNB, a different UE can inform the UE1 of the resource pool or the resource pool can be determined by a predetermined resource. In general, the resource pool consists of a plurality of resource units and each UE selects a resource unit or a plurality of resource units from the resource pool and may be then able to transmit a D2D signal of the UE using the selected resource unit(s). Examples of the resource unit are shown in FIG. 7 (*b*). Referring to FIG. 7 (*b*), it is able to see that the total frequency resources are divided into NF number of frequency resources and the total time resources are divided into NT number of time resources. Hence, the total NF*NT number of resource units can be defined. In this case, it is able to see that the resource pool is repeated with a period of NT number of subframes. In particular, as shown in the drawing, a resource unit can be repeatedly and periodically showed up. Or, in order to gain a diversity effect in time/frequency domain, an index of a physical resource unit to which a logical resource unit is mapped may change in a predetermined pattern according to time. In this resource unit structure, a resource pool may correspond to a set of resource units capable of being used for a UE intending to transmit a D2D signal.

A resource pool can be divided into various types. First of all, the resource pool can be distinguished from each other according to contents of a D2D signal transmitted from each resource pool. For example, the contents of the D2D signal can be distinguished from each other and a separate resource pool can be configured for each of the contents. As the contents of the D2D signal, there may exist SA (scheduling assignment), a D2D data channel and a discovery channel. The SA may correspond to a signal including such information as a location of a resource used by a transmitting UE to transmit a following D2D data channel, MCS (modulation and coding scheme) or MIMO transmission scheme necessary for demodulating other data channels, TA (timing advance), etc. The SA signal can be transmitted in a manner of being multiplexed with a D2D data on a same resource unit. In this case, an SA resource pool may correspond to a resource pool in which the SA is transmitted in a manner of being multiplexed with the D2D data. The SA resource pool can also be called a D2D control channel or a PSCCH (physical sidelink control channel). The D2D data channel (or PSSCH (physical sidelink shared channel)) may correspond to a resource pool usable for a transmitting UE to transmit user data. If D2D data and the SA are transmitted on a same resource unit in a manner of being multiplexed, a D2D data channel from which SA information is excluded can be transmitted only in a resource pool for a D2D data channel. In other word, REs, which are used for transmitting SA information transmitted on an individual resource unit in an SA resource pool, can also be used for transmitting D2D data in the resource pool for the D2D data channel. The discovery channel may correspond to a resource pool for a message enabling a neighboring UE to discover a transmitting UE in a manner that the transmitting UE transmits information such as an ID of the transmitting UE and the like to the neighboring UE.

Although contents of a D2D signal are identical to each other, it may be able to use resource pools different from each other according to a transmission and reception attribute of the D2D signal. For example, although an identical D2D data channel or a discovery message is used, the D2D data channel or the discovery message can be classified into resource pools different from each other according to a D2D signal transmission timing determination scheme (e.g., whether a D2D signal is transmitted at the timing of receiving a synchronization reference signal or is transmitted by applying a prescribed TA to the timing), a resource allocation scheme (e.g., whether an eNB designates a resource for transmitting an individual signal for an individual transmitting UE or an individual transmitting UE itself selects a resource for transmitting an individual signal from a pool), a signal format (e.g., the number of symbols occupied by each D2D signal in a subframe or the number of subframes used for transmitting a D2D signal), signal strength from an eNB, strength of transmit power of a D2D UE and the like. For clarity, a method that an eNB directly indicates a transmission resource of a D2D transmission UE is called a Mode 1 and a method that an eNB designates a transmission resource region and a UE directly selects a transmission resource is called a Mode 2 in a D2D communication. In case of D2D discovery, if an eNB directly indicates a resource, it refers to a Type 2. If a UE directly selects a transmission resource from a predetermined resource region or a resource region indicated by an eNB, it refers to a Type 1.

Transmission and Reception of SA

A mode 1 UE can transmit an SA (or, a D2D control signal, SCI (sidelink control information)) via a resource configured by an eNB. A mode 2 UE receives a configured resource to be used for D2D transmission from the eNB. And, the mode 2 UE selects a time/frequency resource from the configured resource and may be then able to transmit the SA.

Figure 8:
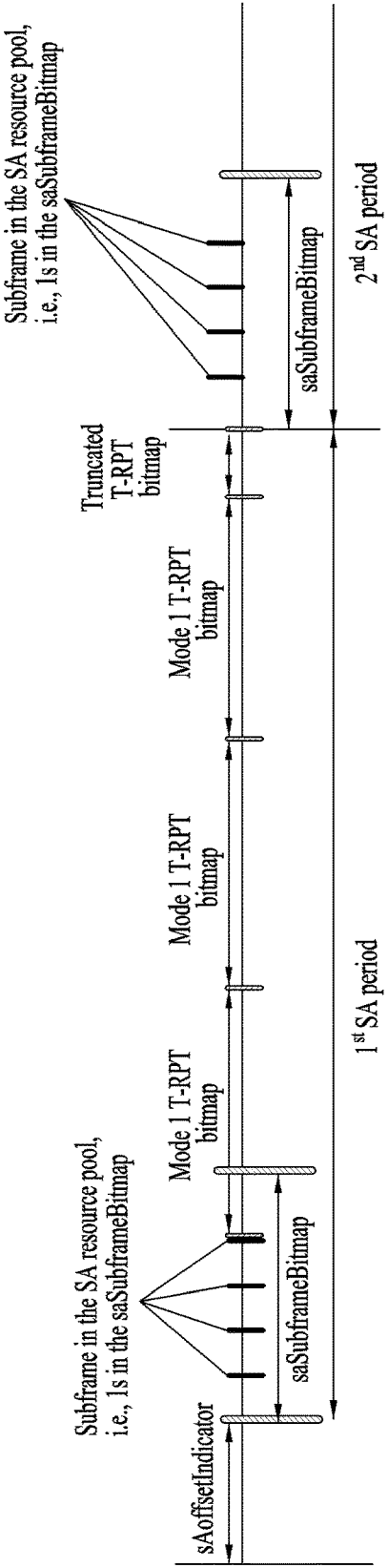
FIG. 8 is a diagram for explaining an SA period.

An SA period can be defined as shown in FIG. 8. Referring to FIG. 8, a first SA period may start at a subframe apart from a specific system frame as much as a prescribed offset (SAOffsetindicator) indicated by higher layer signaling. Each SA period can include an SA resource pool and a subframe pool for D2D data transmission. The SA resource pool can include subframes ranging from a first subframe of an SA period to a last subframe among subframes indicated to transmit an SA in a subframe bitmap (saSubframeBitmap). In case of mode 1, a subframe to be actually used for data transmission can be determined in a manner of applying T-RPT (time-resource pattern for transmission) to the resource pool for D2D data transmission. As shown in the drawing, if the number of subframes included in an SA period except the SA resource pool is greater than the number of T-RPT bits, the T-RPT can be repeatedly applied and a lastly applied T-RPT can be applied in a manner of being truncated as many as the number of remaining subframes.

Meanwhile, in a current D2D operation, in-network UE can transmit a D2D synchronization signal (D2DSS and/or PD2DSCH) according to an indication of an eNB or a necessity of the in-network UE. In this case, timing can be matched with UL or DL timing of a cellular network depending on a case. On the contrary, out-of-coverage UE performs D2D synchronization signal detection. If a measurement result is greater than a predetermined threshold, the UE can determine a corresponding synchronization source as a timing reference of the UE. If the measurement result is less than the threshold, the UE itself becomes a synchronization source and may be able to transmit a synchronization signal using a predefined resource, a sequence and the like. If the out-of-coverage UE performs synchronization signal detection and finds out a plurality of synchronization signals different from each other, the UE can preferentially determine a synchronization signal transmitted by the in-coverage UE as a timing reference. In this case, in-/out-coverage can be distinguished from each other by a root index of the PD2DSS.

Assume that a D2D UE is able to perform a single FFT operation. This may indicate that processing on signals received from asynchronous synchronization sources is unable to be performed at the same time.

Hence, when the aforementioned scheme of determining a synchronization source and the single FFT operation are considered, if a synchronization source is determined based on whether there exists in/out-coverage, signal strength only, a problem may occur. For example, if synchronization is matched with a UE transmitting an advertisement, it may be unable to receive a D2D data UE-specifically transmitted (targeting a receiving UE) from a different UE (of which transmission/reception timing is not matched). In order to solve the aforementioned problem, the present invention proposes a method for a D2D UE to determine a synchronization source. In the following description, a synchronization source may correspond to a UE transmitting a D2D synchronization signal on which detection is performed by a D2D reception UE.

Selection of Synchronization Source

According to an embodiment of the present invention, a UE receives a plurality of synchronization signals and may be then able to select a plurality of candidate synchronization signals from a plurality of the synchronization signals. A synchronization signal is determined in a manner of applying priority to a plurality of the selected candidate synchronization signals and a UE, which has transmitted the determined synchronization signal, can be selected as a synchronization source.

In this case, a plurality of priorities related to a D2D signal can be sequentially applied according to a priority for the application of the priority (which indicates order of plurality of priorities for applying the plurality of priorities). A plurality of the priorities related to the D2D signal can include at least two selected from the group consisting of a priority according to a purpose of data (purpose of data transmission, purpose of data usage), a priority according to a type of a signal transmitted after a synchronization signal, a priority according to a target of a D2D signal transmitted after a synchronization signal, a priority according to a position of a synchronization source, and a priority according to a type of a synchronization source. And, a plurality of the priorities can be sequentially applied until a single synchronization signal is left among a plurality of the candidate synchronization signals.

For example, a plurality of the priorities related to the D2D signal correspond to the priority according to the purpose of data and the priority according to the position of the synchronization source and the priority according to the purpose of data is defined as important in an order of a public safety message, a UE-specific message and a commercial message. The priority according to the position of the synchronization source is assumed to be defined as important in an order of in-coverage and out-coverage. And, assume that the priority for the application of the priority is defined in an order of the priority according to the purpose of data and the priority according to the position of the synchronization source. In this case, a UE can preferentially select a synchronization signal (transmitted by a synchronization source) transmitting a public safety message from a plurality of the selected candidate synchronization signals. If there are two or more synchronization signals (transmitted by a synchronization source) transmitting the public safety message among a plurality of the selected candidate synchronization signals, it may be able to apply the priority according to the position of the synchronization source. In particular, it is able to select a synchronization signal transmitted by an in-coverage synchronization source among the synchronization signals (transmitted by the synchronization source) transmitting the public safety message. If there still exist a plurality of synchronization signals after a plurality of priorities are sequentially applied, it may use a selection method according to signal strength, a random selection method and the like.

In each of a plurality of the priorities, an importance between elements can be defined in advance. Or, the importance between elements can be indicated to a UE via higher layer signaling in each of a plurality of the priorities. The importance between elements determines order of elements for priority. Specifically, for example, while the priority according to the purpose of data can be defined as important in an order of a public safety message, a UE-specific message and a commercial message, an importance can be indicated again by RRC signaling. The public safety message, a UE-specific message and a commercial message correspond to elements in priority according to the purpose of data.

And, the priority for the application of the priority can be indicated to a UE via higher layer signaling. Or, if the priority for the application of the priority is configured in advance and a change occurs, the priority for the application of the priority can be indicated to the UE via RRC signaling.

In the following description, a plurality of priorities related to a D2D signal are explained in detail. Each synchronization source transmitting a synchronization signal can transmit a D2D signal of a different form according to a reference described in the following. A priority of D2D signals can be determined according to a priority classification method proposed in the following.

A priority according to a purpose of data can be defined as important in an order of a public safety message, a UE-specific message and a commercial message. A D2D reception UE identifies a usage (e.g., a usage of data transmitted at detected timing can be indicated via D2DSS/PD2DSCH) of data transmitted at detected timing, determines a signal of a high priority as a timing reference and may be able to perform a following process. (Additionally, priority can also be classified according to importance in a same usage.)

A priority according to a type of a signal to be transmitted after a synchronization signal can be defined as important in an order of a discovery signal and a communication signal. For example, a synchronization signal transmitted by a communication UE may have a higher priority compared to a synchronization signal transmitted by a discovery UE.

A priority according to a target of a D2D signal to be transmitted after a synchronization signal can be defined as important in an order of a discovery signal and a communication signal. A method of selecting a synchronization source. For example, a D2D signal transmitted to a specific UE as a target may have a higher priority compared to a D2D signal transmitted to a plurality of random UEs as a target.

A priority according to a position of a synchronization source can be defined as important in an order of in-coverage and out-coverage.

And, a priority can also be determined on the basis of signal strength (e.g., RSRP, RSRQ, RSSI) of a measured D2DSS and/or PD2DSCH DMRS or a value measured for channel environment.

A priority can also be determined by a combination of the aforementioned methods. For example, a synchronization signal transmitted for data of a public safety transmitted by in-coverage UE may have a higher priority compared to a synchronization signal transmitted for data of a commercial advertisement transmitted by a different in-coverage UE.

The priority mentioned in the foregoing description can be identified by one selected from the group consisting of a root index used for generating a synchronization signal, a PD2DSCH, a plurality of SAs, and a resource pool in which each of a plurality of the SAs is detected. A plurality of the SAs can be received based on each of a plurality of selected candidate synchronization signals. In particular, each UE capable of performing D2D can determine the aforementioned priority based on a method described in the following. A priority can be determined solely or by a combination of the method of determining a priority proposed in the following. In the following proposal, determining a priority can be interpreted as determining each component of a target of the priority.

First of all, a priority can be determined by a synchronization signal (PD2DSS/SD2DSS). More specifically, in case of using a PD2DSS, a new root index is designated instead of a currently used PD2DSS root index 26 and 37 to indicate a priority higher or lower than the root index 26 and 37. (If an added root index is an even number, it is able to select a pair of root indexes of which the sum total is 63 to reduce implementation complexity of a receiver. If an added root index is an odd number, a root index except a pair can be determined by 38. The root index 38 makes a pair with a PSS root index 25 of a legacy cellular system. By doing so, it is able to reduce complexity compared to a root index not making a pair.) As mentioned in the foregoing description, a priority of a D2D synchronization signal of a root index 26 is higher than a root index 37 in a current release. This corresponds to the aforementioned priority according to a position of a UE. According to the present invention, it is able to define an additional priority by defining a further different root index and a release 13 UE can use the root index 26, 37 and the additional root index when a priority according to a new reference is determined. For example, a root index 38 is defined as a PD2DSS root index used for transmitting data of a public safety usage and a higher priority can be set to the root index 38.

In relation to an SD2DSS sequence, similar to a method of determining a priority according to a PD2DSS root index, it is able to determine a priority according to the SD2DSS sequence. For example, a current SD2DSS is defined based on an SSS for legacy cellular synchronization and $N_{ID}^{(1)}$ among parameters determining an SSS sequence has a value between 0 and 167. Hence, it is able to determine a priority in a manner of grouping numbers between 0 and 167. For example, it may be able to define as a higher priority is determined as the ID $N_{ID}^{(1)}$ is getting smaller. After detecting SD2DSS on timings different from each other, a synchronization signal of a lower $N_{ID}^{(1)}$ value can be determined as a timing reference.

Secondly, a priority can be determined using contents of a PD2DSCH. To this end, it is able to indicate a priority using a state not used in a currently define field or it is able to define to indicate a priority using a part of bits of a reserved field. For example, a TDD UL-DL configuration among the current PD2DSCH contents is indicated by 3 bits. In case of FDD, a corresponding bit is set by 000. And, it is assumed that each UE is aware of whether it is FDD or TDD in advance. Hence, in case of a FDD-based D2D operation, a priority can be indicated using a corresponding field. As a further different method, the current PD2DSCH contents have 20 bits defined as reserved bits. A priority can be indicated in a manner of defining a priority field of 2 or 3 bits using a corresponding field. If priority fields in PD2DSCH transmitted on timings different from each other have a same value, a UE can select timing of an identical priority using an additional condition (e.g., RSRP) and the like.

Thirdly, it is able to check data transmitted on each timing and may be then able to determine a synchronization source according to a determined priority. For example, if a priority of a D2D signal relayed by a UE relay is high and it is able to know whether the UE relay performs transmission via SA (scheduling assignment), it is able to determine a priority according to an SA decoding result. For example, a UE selects X number of timing candidates based on signal strength (or correlation) and decodes SA transmitted on timing at which strongest signal strength is examined. If transmission is not performed by the UE relay on the timing, the UE can check whether transmission is performed by the UE relay in a manner of decoding SA on timing at which next strongest signal strength is examined. As a result, it is able to determine a timing at which the transmission of the UE relay is checked as a reference and it may be able to receive D2D data.

Fourthly, it is able to define a plurality of resource pools and it may be then able to determine a priority according to each of a plurality of the resource pools. A UE attempts to detect SA in a plurality of timing candidates and may be able to determine a timing corresponding to a pool of which a priority is highest among resource pools at which the SA is detected as a reference. This can also be interpreted as each resource pool is defined for a usage different from each other. For example, it is able to define as a resource pool 1 corresponds to a resource pool used for a relay usage and a resource pool 2 corresponds to a resource pool used for an advertising usage. Or, each resource pool can be pre-configured by a network.

In relation to determination of a candidate synchronization signal among the aforementioned contents, in order to detect a D2D synchronization signal, correlation is performed on a D2DSS (PD2DSS/SD2DSS) and X number of synchronization signals in which a value higher than a threshold (this can be indicated via high layer signaling or can be defined in advance) is measured can be determined as the candidate synchronization signal. In particular, the candidate synchronization signal may correspond to a signal selected in order of correlation result. Or, the candidate synchronization signal may correspond to a signal selected in order of signal strength.

Figure 9:
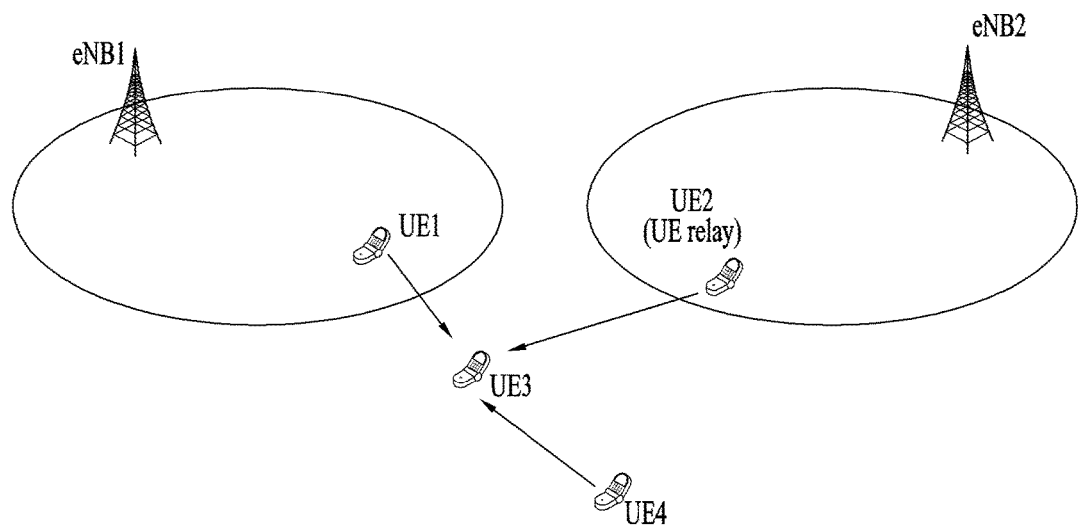
FIG. 9 is a diagram for explaining a method of selecting a synchronization source according to one embodiment of the present invention.

FIG. 9 is a diagram for explaining a method of selecting a synchronization source according to one embodiment of the present invention. In FIG. 9, a UE1 and a UE2 perform D2D transmission at timing aligned with an eNB1 and an eNB2, respectively. A UE4 corresponds to an out-of-coverage UE and performs D2D transmission at a different timing. Assume that a subframe boundary of each of the timings is deviated more than a CP length and it is impossible to perform a single FFT operation. And, assume that the UE1 transmits a D2D signal of a commercial advertisement usage, the UE2 relays data of a public safety usage (or data from a further different UE) by the eNB2 and the UE4 transmits a further different broadcasting signal. In terms of a UE3, assume that signal strength of a D2DSS/PD2DSCH signal received from the UE1 is stronger than signal strength of a signal received from the UE2 and signal strength of a signal received from the UE4 has a medium value between the signal strength of the UE1 and the signal strength of the UE2. If the UE3 corresponds to a LTE release 12 UE, it is able to select the UE1 and the UE2 from the UE1, 2 and 4 on the basis of in-/out-coverage reference and it is able to finally select the UE1 as a timing reference due to a signal strength difference. Yet, if the present invention is applied, the UE1 and the UE2 are selected due to the in-/out-coverage (by applying a first priority) and the UE2 can be finally selected (by applying a second priority) since a UE relay has priority. (In this case, it may assume a threshold for minimum signal strength. In particular, the present invention can be applied in order to make the UE3 stably perform decoding or determine a timing reference from synchronization sources existing in coverage due to a coverage requirement and the like.) In the drawing, a purpose of the D2D transmission performed by the UE1 and the UE2 can be indicated by one of the aforementioned methods of determining priority or a combination of a part of the methods of determining priority. This is because it is preferable to select timing for relaying first since the relaying is performed to spread out important information or is performed for a specific target UE (although signal strength of a signal not used for the relaying is stronger than signal strength of a signal used for the relaying).

Yet, if there are UEs performing (capable of performing) a relay operation in a plurality of cells adjacent to each other, it may be necessary to have a different condition for determining a synchronization source. This may indicate that it is able to additionally consider the number of UEs capable of performing a relay operation in each cell, the number of UEs currently performing a relay operation (or, relay capability of each cell), and the like. In the following, a method of indicating an additional relaying UE and a method of selecting a synchronization source in consideration of relay capability of a cell are explained.

Having configured a relay operation from an eNB, a UE (a UE currently performing a relay operation or a UE capable of performing a relay operation) is able to indicate that the UE is going to perform (currently performing, capable of performing, hereinafter, relay capability) the relay operation via a D2D signal transmitted by the UE. In this case, an indication method via the D2D signal is explained in the following.

The UE can indicate that the UE is going to perform the relay operation via a synchronization signal (i.e., SLSS, the aforementioned PD2DSS, the SD2DSS). Or, the UE can indicate the relay capability via a resource. In particular, the UE indicating the relay capability can transmit a synchronization signal using a resource in which a legacy synchronization signal is not transmitted. For example, a synchronization signal can be transmitted in a subframe different from a subframe in which the legacy synchronization signal is transmitted. It may be able to indicate the relay capability via a root index (sequence index). To this end, it is able to define a new root index (sequence index). For example, in case of newly defining a PD2DSS root index, as mentioned in the foregoing description, in case of defining a new root index in a pair unit or in case of newly defining a single root index only, it may be able to define to use 38. In case of an SD2DSS, it may be able to define $N_{ID}^{(1)}$ deviated from a legacy range to indicate the relay capability.

Moreover, it is able to reuse a legacy root index (sequence index). For example, it may be able to define $N_{ID}^{(1)}$ of an SD2DSS to indicate the relay capability in a manner of classifying the $N_{ID}^{(1)}$ of the SD2DSS into a plurality of sections. A plurality of the sections and meaning of each of a plurality of the sections can be defined in advance.

Or, it is able to indicate the relay capability using a PSBCH (the aforementioned PD2DSCH). It is able to indicate the relay capability using a specific field in the PSBCH or a reserved field. For example, in Rel-12, a bit sequence of the reserved field of the PSBCH is pre-configured and UEs receiving the PSBCH can use the field for the usage of CRC check. In this case, the filed can be used for the usage of indicating the relay capability. In particular, the relay capability can be indicated via a plurality of pre-configured bit sequences and each of a plurality of the bit sequences may have its own meaning.

The relay capability can be indicated using the aforementioned method in SA, communication and the like.

In the foregoing description, the relay capability may mean not only the relay capability of a single UE but also the relay capability of a corresponding cell. For example, it may use a PD2DSS root index different from each other according to the number of UEs capable of performing relaying in a cell. In particular, if the number of UEs capable of performing relaying is greater than X in a cell, a PD2DSS root index 38 is used. If the number of UEs capable of performing relaying is less than X, it may be able to define to use a legacy root index in advance or it may be able to indicate to use the legacy root index via high layer signaling. More generally, the number of UEs capable of performing relaying is classified by a plurality of levels and it is able to define to use a root index different from each other according to each of a plurality of the levels. In addition, it may be able to exclude a UE currently performing a relay operation from the relay capability of each cell. In particular, it may be able to define the aforementioned relay capability to indicate capability capable of performing a relay operation to be performed in the future. By doing so, an out-coverage UE may be able to use synchronization timing of a cell in which a relay operation is to be performed with high probability.

If a D2D signal is transmitted together with relay capability information using the aforementioned method, a reception UE can determine a synchronization source in consideration of relay capability of an individual UE, relay capability of an individual cell as well as legacy RSRP-based measurement when the synchronization source is determined. This can be applied not only to initial selection of a synchronization source but also to re-selection of a synchronization source.

As a different method, DMRS reception power of a discovery signal or a communication signal of a relay UE is measured and the measured DMRS reception power can be used for selecting a synchronization source. For example, a synchronization source is selected based on RSRP of a legacy PSBCH DMRS. Subsequently, if DMRS reception power of a relay UE (known by the aforementioned method or a different method) greater than a prescribed threshold is received, it may be able to select a synchronization source of a cell in which the relay UE exists or it is able to select the relay UE as a synchronization source. In this case, if there are a plurality of relay UEs in a specific cell (or each cell), it may be able to select a synchronization source of a cell of which the sum of DMRS reception power of a discovery signal of a relay UE received from each cell is big. Or, if reception power of a DMRS (e.g., a DMRS of which reception power is biggest among relay UE DMRS) of a relay UE, which is selected as a relay UE of a cell, is equal to or greater than a prescribed threshold, it may be able to select a synchronization source of the cell in which the relay UE exists.

As a different meaning, when an out-coverage UE preferred to perform relaying via a relay UE selects a synchronization source, first of all, the out-coverage UE prioritizes SLSSs of an in-coverage UE and prioritizes an SLSS of which RSRP of PSBCH DMRS is high among the SLSSs of the in-coverage UE. In this case, if it is determined as the selected specific SLSS is inappropriate for a synchronization reference of a relay operation, the selected SLSS is determined as invalid and the out-coverage UE attempts to configure a different SLSS as a synchronization reference of the out-coverage UE. If there is no relay UE synchronized to the selected SLSS, if DMRS reception power of a relay UE does not exceed a prescribed threshold even though the relay UE is synchronized to the selected SLSS or if DMRS reception power of a relay UE synchronized to a different SLSS is greater as much as a prescribed level compared to the DMRS reception power of the relay UE synchronized to the selected SLSS, the selected SLSS is determined as inappropriate for the synchronization reference of the relay operation. Of course, in this process, if it is unable to connect with an appropriate relay UE in a different SLSS, it may be able to maintain an SLSS, which is selected according to a legacy scheme, as a synchronization reference.

Meanwhile, in order to perform the operation of changing a synchronization source selection using a DMRS of a relay UE, it may use a success rate or an error rate of a discovery or a communication packet. For example, it may be able to select a synchronization source of which a successful reception rate of a discovery signal or a communication signal of a relay UE is high within prescribed time. Instead of a reception rate of a simple packet, if a UE discovers that there is relaying via a high layer procedure or recognizes that a relay connection is established, the UE may become a synchronization source of the relay.

Although the present invention proposes a method of determining a synchronization source and a method of selecting a priority under an assumption of a single FFT operation, the present invention can also be identically applied to a case of processing a D2D signal of timing different from each other when multiple FFT operations are available. For example, when two FFT operations are available, it may be able to select two synchronization sources from synchronization sources, which are detected for each processing, different from each other according to a priority.

Configurations of Devices for Embodiments of the Present Invention

Figure 10:
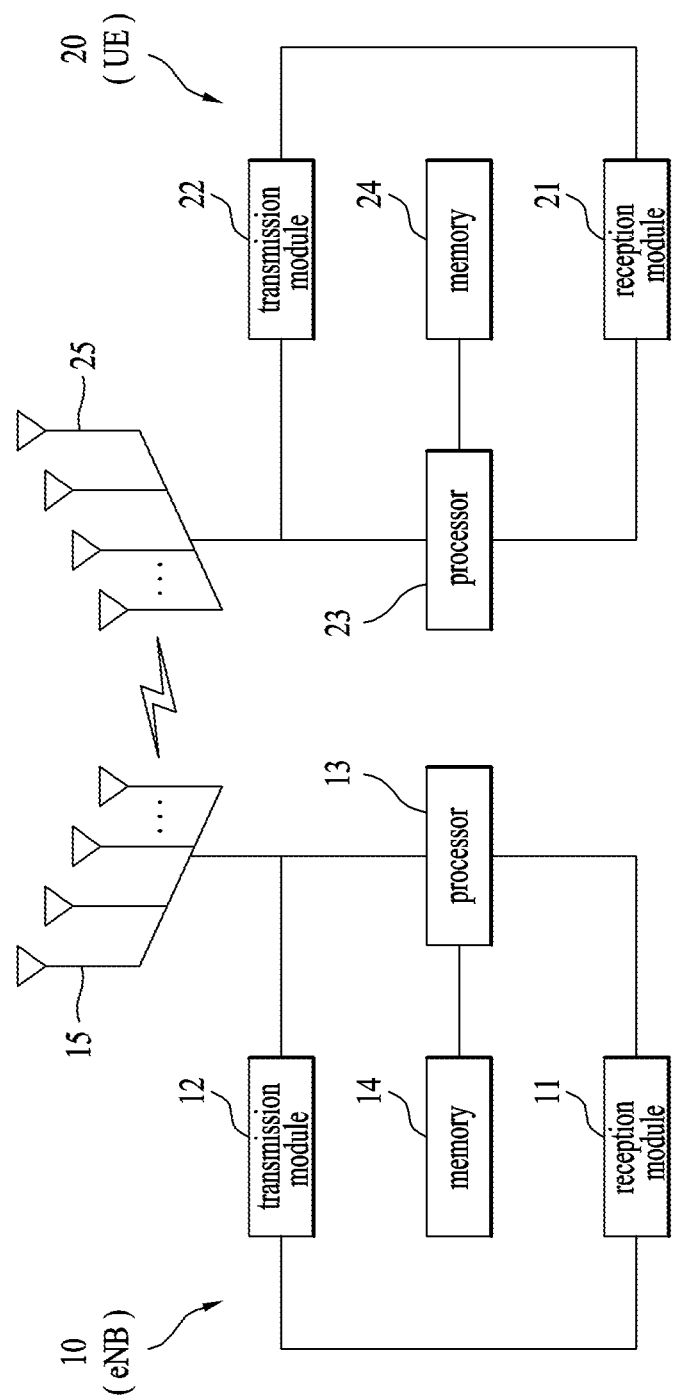
FIG. 10 is a diagram for a configuration of a transceiver.

FIG. 10 is a diagram illustrating configuration of a transmit point apparatus and a UE according to one embodiment of the present invention.

Referring to FIG. 10, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 10, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 10 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

What is claimed is:

1. A method of selecting a synchronization source, which is selected by a device-to-device (D2D) user equipment (UE) in a wireless communication system, the method comprising:
   receiving a plurality of synchronization signals;
   selecting a plurality of synchronization candidate signals that are equal to or greater than a predetermined threshold value among the received plurality of synchronization signals;
   detecting a resource pool to which a scheduling assignment (SA) is detected for each of the plurality of synchronization candidate signals;
   determining a synchronization signal by applying a first priority, which is a priority according to the resource pool, to the plurality of synchronization candidate signals based on the detected resource pool; and
   determining a UE that has transmitted the determined synchronization signal as a synchronization source.

2. The method of claim 1, wherein the synchronization signal is determined by further applying a second priority after the first priority is applied, and
   wherein the second priority is different from the first priority.

3. The method of claim 2, wherein the second priority comprises any one of a priority according to a type of a signal to be transmitted after a synchronization signal, a priority according to a purpose of data, a priority according to a target of a D2D signal to be transmitted after a synchronization signal, a priority according to a position of a synchronization source and a priority according to a type of a synchronization source.

4. The method of claim 3, wherein the second priority according to the purpose of data is defined as important in an order of a public safety message, a UE-specific message and a commercial message.

5. The method of claim 3, wherein the second priority according to the type of the signal to be transmitted after the synchronization signal is defined as important in an order of a discovery signal and a communication signal.

6. The method of claim 3, wherein the second priority according to the target of the D2D signal to be transmitted after the synchronization signal is defined as important in an order of a D2D signal transmitted to a specific UE as a target and a D2D signal transmitted to a plurality of random UEs as a target.

7. The method of claim 3, wherein the second priority according to the position of the synchronization source is defined as important in an order of in-coverage and out-coverage.

8. The method of claim 3, wherein the second priority according to the type of the synchronization source is defined as important in an order of a relay UE and a UE that is not the relay UE.

9. The method of claim 3, wherein the second priority is identified by one selected from the group consisting of a root index used for generating a synchronization signal, a physical D2D synchronization channel (PD2DSCH), a plurality of scheduling assignments (SAs) and a resource pool from which each of the plurality of SAs is detected.

10. The method of claim 1, wherein the predetermined threshold value is a value for a strength of a signal.

11. The method of claim 1, wherein the predetermined threshold value is a value for a correlation result.

12. A device-to-device (D2D) user equipment (UE) for selecting a synchronization signal in a wireless communication system, the D2D UE comprising:
  a receiver; and
  a processor,
  wherein the processor is configured to:
    control the receiver to receive a plurality of synchronization signals,
    select a plurality of synchronization candidate signals that are equal to or greater than a predetermined threshold value among the received plurality of synchronization signals,
    detect a resource pool to which a scheduling assignment (SA) is detected for each of the plurality of synchronization candidate signals,
    determine a synchronization signal by applying a first priority, which is a priority according to the resource pool, to the plurality of synchronization candidate signals based on the detected resource pool, and
    determine the UE that has transmitted the determined synchronization signal as a synchronization source.

* * * * *